Figure 1:
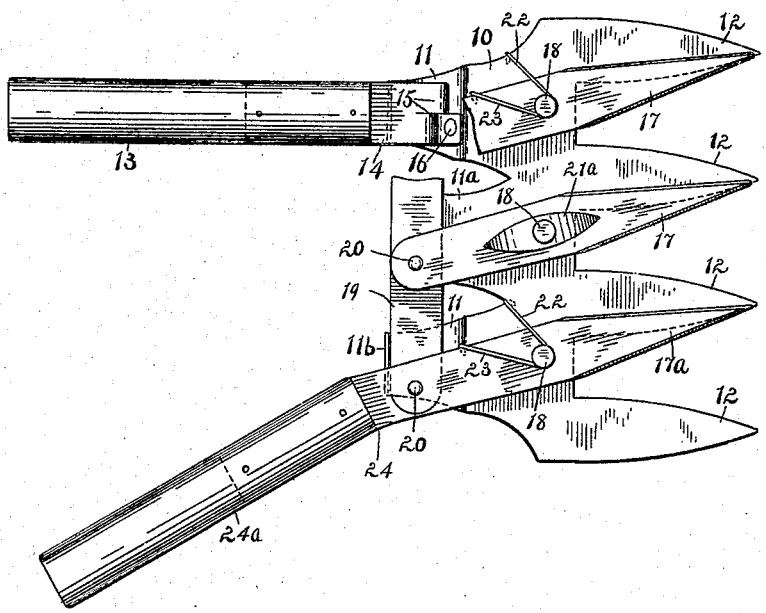

F. NASH.
GRASS CUTTER.
APPLICATION FILED NOV. 29, 1907.

911,516.

Patented Feb. 2, 1909.

WITNESSES:
Mathew J. Marty
C. F. Bassett

INVENTOR
Franklin Nash
BY Frederick Benjamin
ATTY.

UNITED STATES PATENT OFFICE.

FRANKLIN NASH, OF ST. PAUL, MINNESOTA.

GRASS-CUTTER.

No. 911,516.  Specification of Letters Patent.  Patented Feb. 2, 1909.

Application filed November 29, 1907. Serial No. 404,251.

*To all whom it may concern:*

Be it known that I, FRANKLIN NASH, citizen of the United States, residing at St. Paul, in the county of Ramsey and State of Minnesota, have invented certain new and useful Improvements in Grass-Cutters, of which the following is a specification.

My invention relates to cutting or shearing implements and refers especially to manually operated devices adapted for cutting grass, and trimming borders and tender plants of any description.

In devices of this character the necessary mechanical movements must be of the simplest possible design so that the power may be applied to advantage. A serious hindrance to the practical working of such appliances is found in the cutting, or shearing mechanism, a faulty arrangement of the blades producing a frictional impediment to their free action. This is due to the comparatively large area of surfaces which contact under considerable pressure. Another disadvantage lies in the rigidity of the blades which requires an accurate adjustment in the planes of apposition, so that there is not sufficient clearance to produce the best results.

In the improvements which form the subject matter of this application especial attention has been given to the elimination of all unnecessary movements, frictional contacts, and disadvantageous leverages, and particular attention has been paid to the cutting elements the usual arrangement being so modified as to permit of a cutting action of the movable blades when moving in either direction. The fixed blades are set at wide intervals apart and the movable blades are reduced in width so that at the middle point in their movements the cutting margins will be free from each other, and this arrangement gives an opportunity to fashion the blades of both sets with a slight curve which insures a marginal contact practical in its shearing action.

Further objects are to furnish a retracting spring having two functions that of maintaining the blades in proper apposition and restoring the parts to initial position when extended; to furnish a guide or gage to determine the height of the cut above the ground surface; and to supply a simple, durable and efficient mechanism for accomplishing the desired results.

The implement here presented can be produced economically, and a very important feature in this connection is the design of the fixed blade, the tail pieces which form the gage being cut from the intervals between the teeth in such a manner that there need be no waste of metal in the stamping process, except a narrow strip along the margin of the stock.

Another factor which aids in making this a practical device is to be found in the contour of the cutting edges and the relative position of the blade pivots which result in the production of a drawing cut in the shear action and this is especially useful in the class of work for which this implement is devised.

The above advantages are obtained in the appliance illustrated in the accompanying drawing which forms a part of this application, and in which:—

Figure 2:
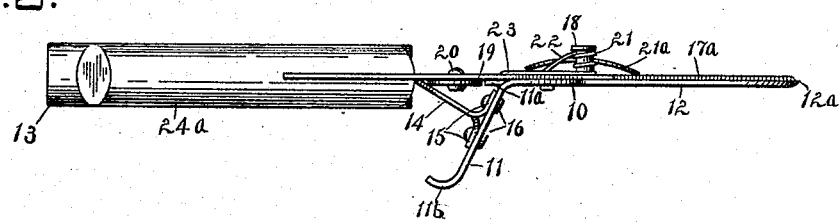
Figure 3:
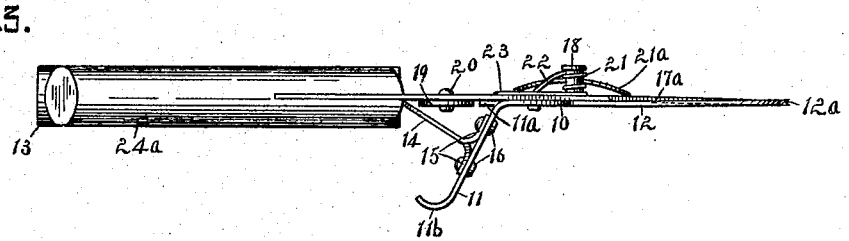

Figure 1 is a top plan view of my improved grass cutter, with the movable parts in initial position; Fig. 2 is an edge view of the device with the parts in the position shown in Fig. 1, and Fig. 3 is an edge view with the upper blades in the middle of their movement, showing the curvature of both sets of blades.

Referring to the details of the drawing, the reference numeral 10 indicates a plate of steel, having rearwardly projecting tongues 11, 11$^a$, the two outside tongues being depressed below the general plane of said plates at an angle, as shown in the edge views, and the lower end 11$^b$ curved to form a smooth runner for contact with the ground when used as a grass cutter, the vertical distance from the point 11$^b$ to the plane of said plate 10, determining the length of cut. The front edge of said plate is furnished with forwardly projecting teeth 12 the margins of which are preferably slightly beveled, as shown at 12$^a$, in the manner common in shears, sickles and all similar shearing tools. The said plate 10 is provided with a handle 13, which I prefer to construct of wood.

In one end of the handle is inserted an attaching plate 14, which is split from the extremity, and the tongues 15 thus formed bent in opposite directions, and secured to the left hand tongue 11 of the plate 10 by rivets or screws 16. The structure thus described constitutes the lower or fixed blade of the apparatus the term fixed being used in a relative sense, since in operation there will usually be a mutual movement of the upper and lower cutting devices. The upper cutting device is constructed of a plurality of blades 17 pivoted near their middle points to the plate 10 by cap screws or rivets 18. The rear ends of said blades 17 are pivoted to a link 19 by rivets 20. The rivets 18 project above the blades and are furnished with heads which serve to retain springs 21, 21ª. The springs 21 are formed with coils which encircle the bodies of the outside rivets 18, the ends 22, 23, of the springs being recurved at their extremities to engage the margins of the plate 10 and the corresponding blade 17, their action being to hold the blades in retracted position as shown in Fig. 1. Only the outside rivets and blades are supplied with the springs 21, the intermediate blade having simply a compressing spring. This consists of an elliptical plate 21ª curved upon the flat blade through which the rivet 18 passes. The right hand blade 17ª has its rear end prolonged and bent at a slight angle at 24, and furnished with a handle 24ª. This device may be operated by either one or both hands, and the shape of the cutting edges, which are elliptical in the case of the lower blades, produces an easy shearing stroke and the guides 11 regulate the height of the cut above the surface of the ground when trimming grass, or plant borders.

A stop for limiting the stroke is furnished by the rear edge of the middle tongue 11ª, which is shorter than the outer bent tongues 11, and as it lies in the same plane with the link 19, the latter will engage said margin at the end of each stroke, whether to the right or left.

The material of which the blades are made should be sufficiently flexible to permit of a slight curve being given to both sets of blades so that when the blades 17, 17ª, are at the middle of the stroke, their extremities and those of the lower blades will lie approximately in the same plane (see Fig. 3) thus insuring a marginal contact of uniform tension along the blade edges, throughout the extent of the stroke.

Having thus described my invention what I claim is:—

1. In a cutting device, a lower member provided with cutting blades and downwardly extending tongues, cutting blades pivotally mounted relative to said lower member, a link connecting said blades, and handles secured respectively to the lower member and one of the pivoted cutting blades.

2. In a cutting device, the combination of a lower cutting member having blades formed integral therewith, and formed with downwardly bent tongues, an upper cutting member composed of a plurality of blades pivoted to said lower member, and an operative connection between said blades, resilient means for holding said members in apposition, and handles for the respective members.

3. In a cutting device, the combination with a base-plate, and blades formed integral with said plate, of bent tongues formed integral with the base plate, a series of blades pivoted to said base-plate, operative connection between said blades, and means for operating said series of blades and said base-plate.

4. In a cutting device, a lower member provided with integral cutting blades and downwardly extending tongues, said tongues having their ends curved upwardly, a plurality of cutting blades pivotally mounted on said lower member, a handle secured to said lower member, a handle secured to one of said cutting blades, and a link connecting said blades.

In testimony whereof I affix my signature in the presence of two witnesses.

FRANKLIN NASH.

Witnesses:
R. J. OLIN,
J. S. KOHL.